United States Patent [19]

Takeyasu

[11] Patent Number: 4,527,129
[45] Date of Patent: Jul. 2, 1985

[54] KLYSTRON TUNING CONTROL SYSTEM

[75] Inventor: Yoshiyuki Takeyasu, Tokyo, Japan

[73] Assignee: NEC Corporation, Tokyo, Japan

[21] Appl. No.: 555,369

[22] Filed: Nov. 28, 1983

[30] Foreign Application Priority Data

Dec. 8, 1982 [JP] Japan ................... 57-215922

[51] Int. Cl.³ .............................................. H03F 3/56
[52] U.S. Cl. ...................................... 330/45; 331/83;
331/177 R
[58] Field of Search ............... 330/44, 45, 49; 331/83,
331/177 R; 334/20-22; 315/5.46; 455/123-125

[56] References Cited

U.S. PATENT DOCUMENTS 4,216,409 8/1980 Sato et al. .......................... 330/45 X
4,234,960 11/1980 Spilsbury et al. ................. 334/20 X

*Primary Examiner*—James B. Mullins
*Attorney, Agent, or Firm*—Laff, Whitesel, Conte & Saret

[57] ABSTRACT

A klystron tuning control system has a D.C. motor which is connected to the tuning shaft of the klystron. The position of the tuning shaft is detected electrically and used to control the turning of the D.C. motor in order to reduce to zero a difference between the output voltage of the detecting means and a reference voltage. At zero, a coincidence signal is produced so that a counter means may count a predetermined number and provide an output responsive to which the D.C. motor is operated in only a predetermined direction for a short period of time.

6 Claims, 2 Drawing Figures

KLYSTRON TUNING CONTROL SYSTEM

BACKGROUND OF THE INVENTION

1. Field of the Invention

The present invention relates to a preset tuner control system for automatically controlling the tuning frequency of a klystron vacuum tube in a radio transmitter system, and more particularly, to a circuit for compensating for the backlash of the tuner's tuning mechanism.

2. Description of Prior Art

A kylstron power amplifier is employed in a transmitter system for use in satellite communication or satellite tracking control. A cavity tuning control of the amplifier is required by any change in the transmitting frequency of the klystron and should desirably be accomplished automatically and accurately. Unless this cavity tuning control is properly accomplished, the amplitude vs. frequency characteristics cannot be faithfully reproduced.

Since gears, chains and drive screws are used in the tuning mechanism of a klystron cavity, the presence of minute gaps between these components may cause a backlash. A preset tuner of an analog type servo mechanism controls the tuning shaft of the klystron with a D.C. motor. When the motor turns in the clockwise or counter-clockwise direction, as desired, there is a deviation corresponding to the backlash between the driving of the tuning shaft of the klystron cavity in the clockwise direction and in the counter-clockwise direction. As a result of this backlash, there is a failure to achieve a proper adjustment of this tuning shaft.

SUMMARY OF THE INVENTION

An object of the present invention is to provide a klystron tuning control system to eliminate the adverse effect of backlash on a klystron tuning control fo making a frequency change.

According to the present invention, a klystron tuning control system comprises a D.C. motor connected to the tuning shaft of a klystron. A detection means electrically detects the position of the tuning shaft. A control means operates the D.C. motor to reduce to zero the difference between the output voltage of the detecting means and a reference voltage, thereby providing a coincidence signal. A counter means counts the coincidence signal by a predetermined number and provides a counting output. The D.C. motor is turned in a predetermined direction for only a short period of time in response to the counting output.

BRIEF DESCRIPTION OF DRAWINGS

The features and objects of the present invention will become more apparent from the following detailed description taken in conjunction with the accompanying drawings, wherein.

PREFERRED EMBODIMENTS OF THE INVENTION

Figure 1:
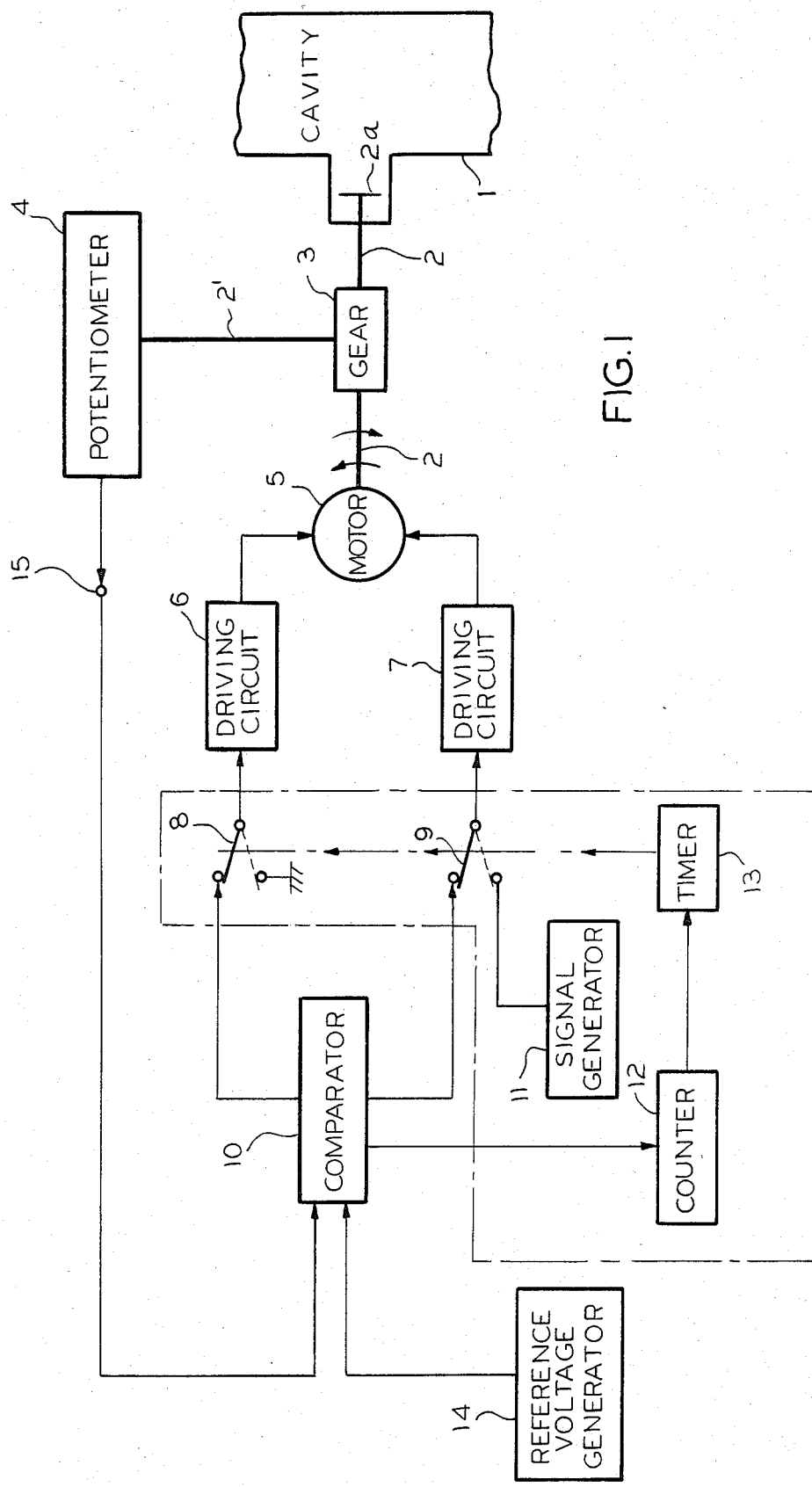
FIG. 1 is a block diagram of a klystron tuning control system, which is a first preferred embodiment of the invention.

Referring to FIG. 1, a klystron cavity 1 is coupled through a gear 3 and a tuning shaft 2, having a plunger 2a, to a D.C. motor 5. The D.C. motor 5 is actuated responsive to driving current supplied from a clockwise driving circuit 6 and a counter-clockwise driving circuit 7, which are connected through switches 8 and 9 to the output of a comparator 10, respectively. A potentiometer 4 is interlocked with the rotating shaft 2' of the gear 3, and feeds its position-detective voltage through switch 15 to one input of the comparator 10. The output of a reference voltage generator 14 is supplied to the other input of the comparator 10. The coincidence output of the comparator 10 is entered into a counter 12, whose output is supplied to a timer 13 for controlling the switches 8 and 9. One terminal of the switch 8 is grounded, and the corresponding one terminal of the switch 9 is connected to a signal generator 11.

In the above described system, the switches 8 and 9 are initially set in their respective upper positions, as shown in FIG. 1. The potentiometer 4 is interlocked through the gear 3 with the shafts 2 and 2' which control tuning of the klystron cavity. Therefore, the potentiometer 4 resistance varies with the tuning position of the cavity. Potentiometer 4 divides a D.C. voltage, which is supplied thereto from a power source (not illustrated), and generates a position-detection voltage which appears at a terminal 15. The comparator 10 compares this position-detection voltage delivered by the potentiometer 4 with the output voltage of the reference voltage generator 14. Comparator 10 generates a voltage corresponding to the intended tuning position, and supplies an error voltage, which is the difference between them. The error voltage is supplied to either the clockwise driving circuit 6 or the counter-clockwise driving circuit 7, depending upon the polarity of the error voltage. The D.C. motor 5 is turned to minimize this error voltage.

This analog type servo mechanism tunes the cavity 1 of the klystron by relocating plunger 2a to a position where the position-detection voltage of the potentiometer 4 and the reference voltage of the reference voltage generator 14 are equal to each other. If there is a backlash in the gear 3 and the mechanism around it, a deviation will occur in the substantial position of the plunger 2b between the detection of a zero position by the turning of the D.C. motor 5 in one direction or in the other direction.

In the system, the coincidence output of the comparator 10 is fed to the counter 12, which counts how many times this coincidence output is sent out. In this case, if the counter 12 counts the coincidence output two times, for example, it supplies a trigger output to the timer 13, and at the same time it resets itself. As a result, the timer 13 changes over the switches 8 and 9 to their respective lower positions, which are indicated by the dotted lines in FIG. 1. Timer 13 keeps the switches in this changed over position for only a predetermined short period of time, a control signal is fed from the signal generator 11 to the counter-clockwise driving circuit 7.

This action forcibly turns the D.C. motor 5, a little, in the counter-clockwise direction to return the switches 8 and 9 to their respective upper positions, as shown in FIG. 1. After that, the control is resumed to reduce the error voltage to zero. Thus, the backlash adjustment is always made in only the clockwise direction, and any backlash that may occur is always corrected in the same fixed direction and, therefore, will have no adverse effect. Therefore, the frequency can be measured and always set on the basis of an adjustment in this fixed direction.

The active period of the timer 13 should desirably be minimized within the extent that any vibration may not occur from the control system. In other words, the control system operates stably. The switches 8 and 9 may comprise transistor switches.

Figure 2:
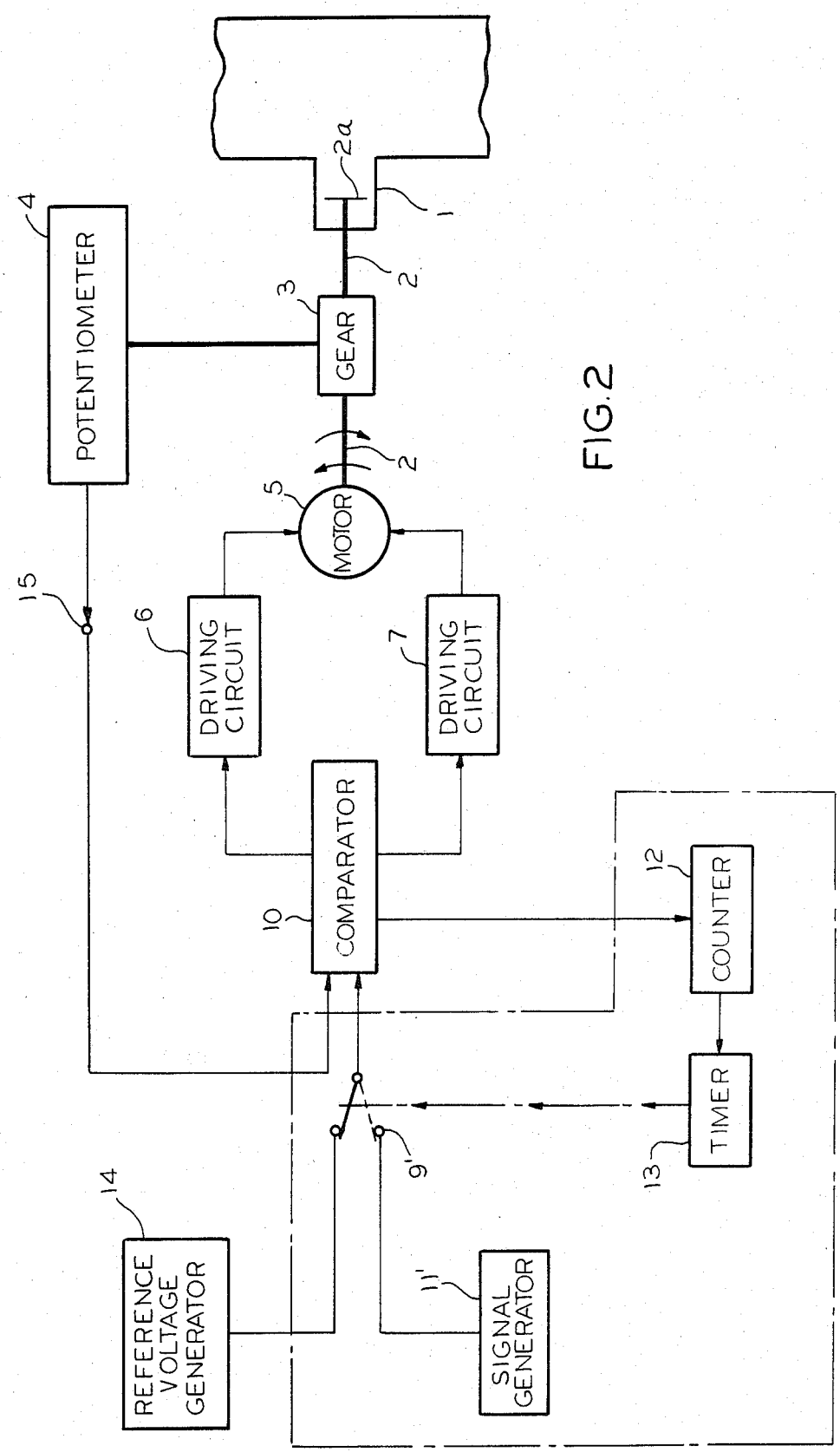
FIG. 2 is a block diagram of another klystron tuning control system, which is a second preferred embodiment of the invention.

FIG. 2 illustrates a second embodiment of the tuning control system according to the present invention. This embodiment features an arrangement wherein a switch 9' is provided on the input side of the comparator circuit 10 so that, when a counter-clockwise turn is to be forcibly given, the reference input voltage of the comparator 10 is altered. That is, the switch 9 connects either the generator 14 or a signal generator 11' to the comparator 10 in response to the output of the timer 13. Since this embodiment is similar in other respects to the first embodiment illustrated in FIG. 1, further details are dispensed with herein.

As hitherto described in detail, according to the present invention, the cavity of a klystron is always turned in only one direction. Accordingly, any backlash of the gear that may arise owing to the rotational direction of the tuning shaft will have no adverse effect. The amplitude vs. frequency characteristic of the klystron can be faithfully reproduced.

Those who are skilled in the art will readily perceive how to modify the system. Therefore, the appended claims are to be construed to cover all equivalent structures which fall within the true scope and spirit of the invention.

What is claimed is:

1. A klystron having a tuning control system, said klystron having a tuning shaft for mechanically moving a part in a tuning cavity, said part moving with backlash, said control system comprising a D.C. motor connected to rotate the tuning shaft of said klystron; detection means for electrically detecting a position of the tuning shaft; means for supplying a reference voltage; control means for driving the D.C. motor to reduce to substantially zero the difference between the output voltage of the detecting means and said reference voltage, thereby providing a conincidence signal; counter means responsive to the coincidence signal for providing a predetermined count number which is indicative of the klystron tuning and for providing a counting output signal; and means for turning the D.C. motor in a predetermined direction for only a short period of time in response to the counting output signal, whereby a turning of said tuning shaft always ends in a brief rotation in the same direction to eliminate variations caused by backlash.

2. The klystron tuning control system of claim 1, wherein said motor is connected through a gear means to said tuning shaft, and means for timing short period of time to be long enough to take up any backlash in said gear train.

3. A klystron tuning control system comprising a cavity having a plunger mounted therein for reciprocal mechanical movement in order to tune said cavity, means for mechanically moving said plunger with backlash in either of two directions responsive to a tuning selection command, and means responsive to an end of said mechanical movement for adding an incremental movement in only a predetermined one of said two directions whereby said movement always ends with an incremental movement in one direction, said incremental movement exceeding the backlash of plunger movement.

4. The system of claim 3, and means for giving a reference voltage, means for detecting the position of said plunger comparing means responsive to said reference voltage and to said detector means for giving a signal representing the amount of movement required to bring said plunger into position, and means responsive to said comparing means for operating said mechanically moving means.

5. The system of claim 4, wherein said comparing means includes a counter for digitally indicating an amount of movement that is required.

6. The system of claim 5, wherein said comparing means has an output of either of two polarities depending upon the required direction of movement, a motor for driving said plunger in either of said reciprocal movements, a pair of driving circuits coupled to individually drive said motor in either of said reciprocal movements depending upon which one of said pair of driving circuits is activated, means for selectively activating one of said driving circuits for moving said plunger in a selected direction, and said means responsive to the end of said mechanical movement comprises timer means operated responsive to the end of the activations of the selected drive circuit for activating a predetermined one of said driving circuits.

* * * * *